United States Patent [19]
Haenel

[11] Patent Number: 6,064,762
[45] Date of Patent: *May 16, 2000

[54] SYSTEM AND METHOD FOR SEPARATING FOREGROUND INFORMATION FROM BACKGROUND INFORMATION ON A DOCUMENT

[75] Inventor: Walter Haenel, Holzgerlingen, Germany

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/696,960
[22] PCT Filed: Jun. 6, 1995
[86] PCT No.: PCT/EP95/02156
  § 371 Date: Aug. 19, 1996
  § 102(e) Date: Aug. 19, 1996
[87] PCT Pub. No.: WO96/19778
  PCT Pub. Date: Jun. 27, 1996

[30] Foreign Application Priority Data

Dec. 20, 1994 [DE] Germany .............................. 44 45 386

[51] Int. Cl.$^7$ ................................. G06K 9/00; G06K 9/34
[52] U.S. Cl. ........................................ 382/171; 382/172
[58] Field of Search ..................... 382/170, 171, 382/176, 168–172, 173; 358/462

[56] References Cited

U.S. PATENT DOCUMENTS 5,280,367  1/1994  Zuniga ..................................... 358/462

Primary Examiner—Phuoc Tran
Attorney, Agent, or Firm—Shelley M Beckstrand; Norman L. Gundel

[57] ABSTRACT

Foreground information is separated from background information on a document where the foreground information is superimposed in an additive or subtractive manner on the background information. The document is divided into a plurality of segments and a frequency distribution of extreme values of the signal intensity in each of the segments is determined. The frequency distribution so determined exhibits one main mode (background mode) which essentially contains the background information. If an adequate foreground/background separation cannot be achieved with the first two steps, the determination of a frequency distribution of signal intensities of the whole document is effected in a third step and a sharper separation effected by a fourth step in which a joint evaluation of the two frequency distributions is determined. To determine a threshold value of a signal intensity for the background information in the document, this threshold value is derived in a fifth step, either from the flank of the background mode towards the foreground information or from one of the flanks of a further main mode opposite the background mode, preferably by a linear approximation of a point on one of the flanks of the two main modes.

17 Claims, 6 Drawing Sheets

FIG. 4B
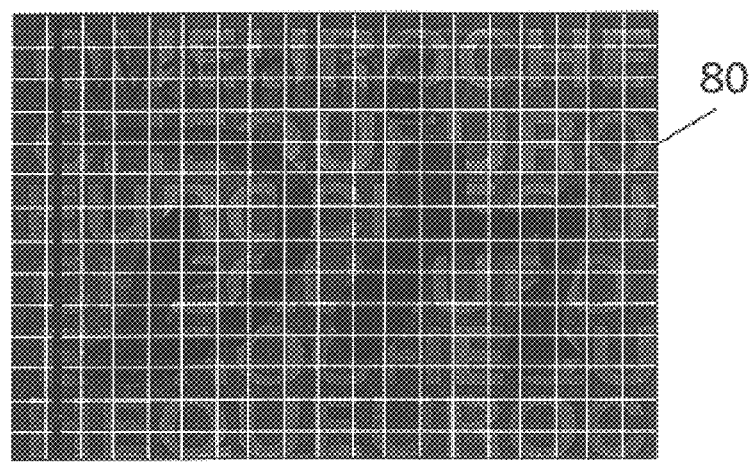
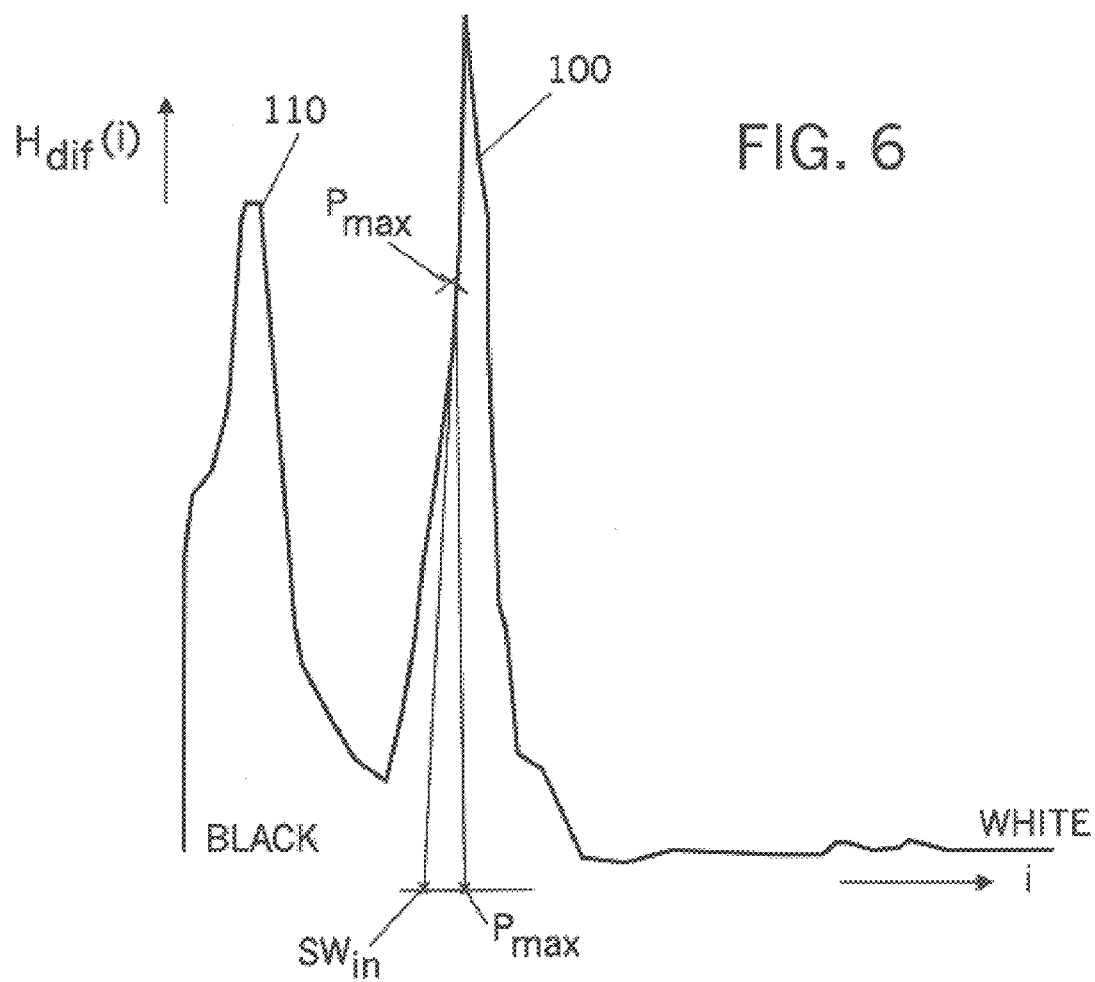
FIG. 6

FIG. 9
FIG. 10
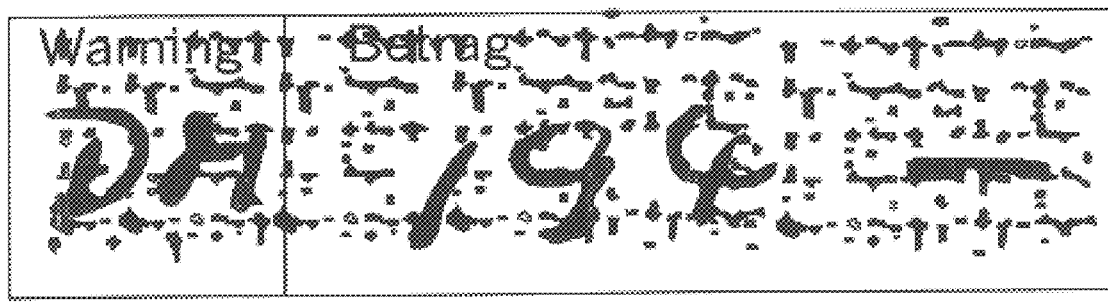
FIG. 11

SYSTEM AND METHOD FOR SEPARATING FOREGROUND INFORMATION FROM BACKGROUND INFORMATION ON A DOCUMENT

FIELD OF INVENTION

The invention relates to a system and process for separating foreground information from a background information on a document, whereby the foreground information is superimposed in an arithmetic (e.g., either additive or subtractive) manner on the background information. The method is particularly suitable for determining a threshold value for a signal intensity of the background information on the document, for clarifying the background information on the document and also for converting electronic grey scales to black and white.

BACKGROUND OF THE ART

In employing electronic document processing it is frequently necessary, because of the quantity of data and to simplify subsequent processing, to convert electronic grey scale image data to black and white. In doing this, only text and numbers should be left as black and white information and not background patterns or pre-printed dropout colors, in order to obtain good legibility or to make it possible to effect subsequent electronic processing. For this it is necessary to be able to distinguish between the foreground containing information and the background, which generally contains no information but is structured, for example for safety or design reasons. If it is possible to distinguish between a foreground and a background, this allows the background to be removed, that is, suppression or cancellation of the background, in order to leave the foreground information.

For more certain subsequent processing of the foreground information it is necessary, in particular, to ensure that no component of the background flows into the foreground as an undesired artefact where it may lead to erroneous interpretations.

Black and white pictures, which should satisfy the requirements for subsequent electronic processing, frequently cannot be produced by the processes known from the current state of the art for background removal if the document has a highly structured background, as is the case for security reasons, for example, with the Eurocheque or an identity card. Highly structured backgrounds are generally backgrounds characterised by high contrasts which are preferably linear or like writing and exhibit structure dimensions which are of the same order as the dimensions of the written entry.

As an example of a document with a highly structured background FIG. 1 shows the currency and amounts field of a Eurocheque in grey scale representation. FIG. 2 shows the grey scale distribution along a horizontal line in FIG. 1. For this, the line was placed in the region between the handwritten and the machine-printed entries in the currency and amount field in such a way that it did not cut the entries. High values (in the "white" direction) represent a clear grey value and low values (in the "black" direction) represent dark grey values. With a conventional use of 256 grey values, grey value 0=black and grey value 255=white.

As can be seen from FIG. 2, the grey values of the background (not the frame) extend uniformly to a particular limit (threshold) which they generally, with a few exceptions such as, for example, as a result of framing or through image distortion, do not fall below. This results from the printing technology in manufacture in which the color saturation can be effectively controlled. This is generally also desired, otherwise the entries are also difficult for humans to read or may even become unreadable. The excursions below the threshold value in the "black" direction which can be clearly seen in FIG. 2 arise from the frame and the dividing line between the currency and the amount fields.

The grey value of the (handwritten and machine printed) entries, caused by the subtractive color behaviour of the most used printers, in each case lies below this threshold, however, often only very slightly. Consequently, the contrast with the background is considerably less pronounced than the contrast within the background. Subtractive colour behaviour in general means that additionally applied color pigments remove further colour components from the spectrum, i.e. that the grey value becomes darker overall.

Known methods for black and white conversion employ a background threshold value, the light-dark contrast or criteria such as the line width or the standard deviation of adjacent grey values. Contrast methods are generally not suitable for use in the field of applications described above of documents with a highly structured background since the contrast change in the background can be more pronounced than between the background and the entries. In the same way the evaluation of the line width is often unsuitable since the background structure often has a linear structure as can be seen in the example of the Eurocheque in FIG. 1.

From the printing technology properties it follows that the use of threshold value methods should give optimal results. Threshold value methods mean those methods in which the grey value is divided into classes which are limited by the threshold values concerned. However, the difficulties here lie in the correct and optimal determination of the threshold value. The threshold value is frequently calculated from the histogram of the grey values in accordance with various algorithms which should lead to the best possible black and white image. In the literature, these threshold value processes are also referred to as "thresholding" processes.

A review of the known processes can be found in "A Survey of Thresholding Techniques" by P. K. Sahoo, S. Soltani and A. K. C. Wong, in Computer Vision, Graphics and Image Processing, 41, 233–260, 1988. A distinction is made there between histogram transformation methods, which alter the shape of the histogram to determine the threshold value and algorithms for calculating the threshold value. The most important of the methods represented by Sahoo et al. are briefly discussed below in relation to their use for documents with highly structured backgrounds.

Histogram transformation methods:
 The methods mentioned by Sahoo et al. for improving the histograms by means of edge operators cannot be used for highly structured backgrounds since the method does not differentiate between the edges of the background and those of the entry. The standard deviation of adjacent grey values is even less suitable for changing the histogram, since here too not only the entry but more particularly the background leads to an increased value of the standard deviation.

Algorithms for calculating the threshold value:
 The known "Mode and Concavity" methods likewise cannot be successfully employed for documents with highly structured backgrounds, since the highly structured background often produces a number of modes and concavities in the histogram of the grey values, so that unambiguous allocation to background and foreground is not possible.

The "Otsu Method" is also unusable, since this algorithm divides the picture point into classes by maximizing the interclass variance and it is not known in advance how many classes it will give and which of them contains the information sought.

The known entropy method attempts to calculate the threshold value in such a way as to maximize the data content of black and white image. However, since distinction is not made between the data contents of the background and the entry, this method too cannot be considered in the case of documents with highly structured backgrounds.

Supplementary literature to that of Sahoo et al. discusses methods and other known methods can also be found in the following sources:

In J. M. White, G. D. Rohrer, "Image Thresholding for Optical Character Recognition and other Applications Requiring Character Image Extraction", IBM J. Res. Development Vol.27 No.4 July 83 two methods are described for black and white conversion:

1) Method with a dynamic threshold, which leads, however, to results as shown in FIG. 6, and
2) a method which evaluates the line width, but is, however, unsuitable for documents with a highly structured background.

"Greyscale Assist for Machine Recognition of Courtesy Amount on Cheques", IBM Technical Disclosure Bulletin Vol.34 No.5 October 1991, pp. 374–377 describes a method which uses two images of different resolutions in order to select the threshold value.

In N. Otsu, "A Threshold Selection Method from Grey Level Histograms", IEEE Transactions on Systems, Man and Cybernetics, Vol. SMC-9 January 1979, pp. 66–67 the Otsu Method is presented.

T. Kurita, N. Otsu and N. Abdelmalek in "Maximum Likelihood Thresholding based on Population Mixture Models", Pattern Recognition, Vol.25 No. 10, 1231–1240, 1992, discuss the Otsu Method and applied methods.

M. A. Sid-Ahmed in "A Hardware Structure for the automatic selection of Multi-Level Thresholds in Digital Images", Pattern Recognition, Vol.25 No.12, 1517–1528, 1992, discusses a further development of the Otsu Method.

In C. K. Lee, C. H. Li, "Adaptive Thresholding via Gaussian Pyramid", China 1991, International Conference on Circuits and Systems June 1991, Shenzhen, China, a further development of the entropy method is discussed.

None of the above-listed known methods is capable of solving satisfactorily the problem of a highly structured background or providing satisfactory images which meet the requirements for subsequent electronic processing.

SUMMARY OF THE INVENTION

The object of the invention is to provide a method for the separation of a foreground information from the background information which permits the calculation of a threshold value for the maximal (darkest) background grey scale in a half-tone picture.

The object of the invention is achieved by a method as described in the independent claim 1.

In accordance with the invention a document is divided in a first stage into a number of segments and in a second stage a frequency distribution of an extreme value of the signal intensity in each of the segments is determined. The frequency distribution so determined exhibits a main mode (background mode) which essentially contains the background information. In cases where adequate foreground/background separation cannot be achieved with the first two steps, a frequency distribution of signal intensities over the whole document can be effected in a third step and, in a fourth step, a sharp separation can be achieved by evaluating the two frequency distributions obtained.

To determine a threshold value of a signal intensity of the background information in the document, this threshold value is derived in a fifth step either from the flank of the background information inclined towards the foreground information or from the flank of a further main mode adjacent to the background, preferably through a linear approximation of a point on the flank of the two main modes.

To clean up the background information in the document the information in the document can be divided, in an additional sixth step, into signal intensities above and below the threshold value and, in a seventh step, that representing the background region deleted.

In using the process in accordance with the invention for black and white conversion of an image document, use is made of the properties of the document produced by printing and a black and white image produced which meets the requirements for subsequent electronic processing.

The process in accordance with the invention can be employed for cleaning up the background of documents/images with any desired background, but must retain the foreground information produced by recorder or printer subtractively from the background. This means that the grey value resulting from superimposition of the foreground information on the background must be darker than the original grey value of the background document.

A particular advantage of the process in accordance with the invention over the known methods is in the cleaning up of the background of documents with a highly structured background, i.e. with great contrasts in the background, particularly if these have a pronounced linear or writing-like character. Good results can then be achieved if the structural dimensions of the background structure are of the same order of magnitude as the dimensions of the foreground information writing.

The method in accordance with the invention is particularly suitable for "on-line" determination of the threshold value in grey images, that is, the determination of the threshold value in the precise state in which the document exists. In general, the grey value of a document changes, e.g. as a result of the intensity of illumination or as a result of the fading of the document. Likewise, the color saturation and the condition of the paper vary from document to document. An effect also arises from differences in scanners, e.g. from the sensitivity of the scanner in general or through spectrally conditioned sensitivities, which will directly affect the measurement of the grey value of the document.

Using the background threshold value obtained with the aid of the present invention the background can subsequently be cleaned up, e.g. by eliminating all grey values lighter than the threshold value determined and further processing of the document, e.g. character recognition, can be carried out.

By employing several suitable threshold values the number of grey-scales can be reduced without great loss of information, where the choice of the threshold values influences the magnitude of any loss of information.

The teachings of the invention are not, however, limited to use in optical image processing, but can be employed in analogous manner for the separation of foreground information from a desired background in all fields where the foreground signal is additively or subtractively superimposed on the background.

Further advantageous embodiments of the invention can be found in the sub-claims.

DESCRIPTION OF THE DRAWINGS

For further explanation of the invention, embodiments of the invention are described below with reference to the drawings. These show:

FIG. 6 the determination of a threshold value $SW_{1N}$ for the background grey value but to a first approximation, FIG. 7 a more precise method for the determination of the threshold value, FIG. 8 an unsmoothed histogram, as frequently obtained because of the limited image resolution, FIGS. 9/10 results of a background cleaning of the image from FIG. 1, produced by a known state of the art process, and FIG. 11 a result of a background cleaning of the image from FIG. 1 with the process in accordance with the invention.

DETAILED DESCRIPTION OF THE INVENTION

Figure 1:
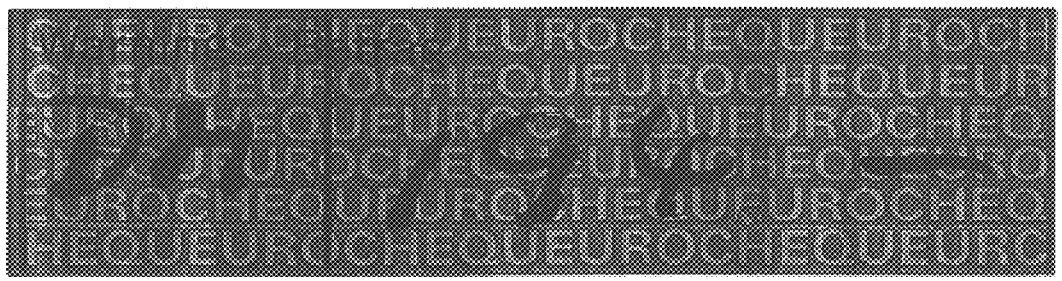
FIG. 1 the currency and amount fields of a Eurocheque in a grey-scale representation, FIG. 2 the grey value distribution along a horizontal line in FIG. 1, FIG. 3 a standard histogram $H_{std}(i)$ of the frequency distribution of the grey value of the image shown in FIG. 1, FIG. 4A a segment histogram $H_{seg}(i)$ of the frequency distribution of grey values for the image shown in FIG. 1, FIG. 4B the segment size selected for FIG. 4A and the segment rastering of a part image from FIG. 1, FIG. 5A a difference histogram $H_{dif}(i)$, formed from the standardised segment histogram $H_{seg}(i)$ from FIG. 4A and the standardised standard histogram $H_{std}(i)$ from FIG. 3, FIG. 5B a difference histogram $H_{dif}(i)$, as for a multimodal histogram generally, but with only two main modes.
Figure 2:
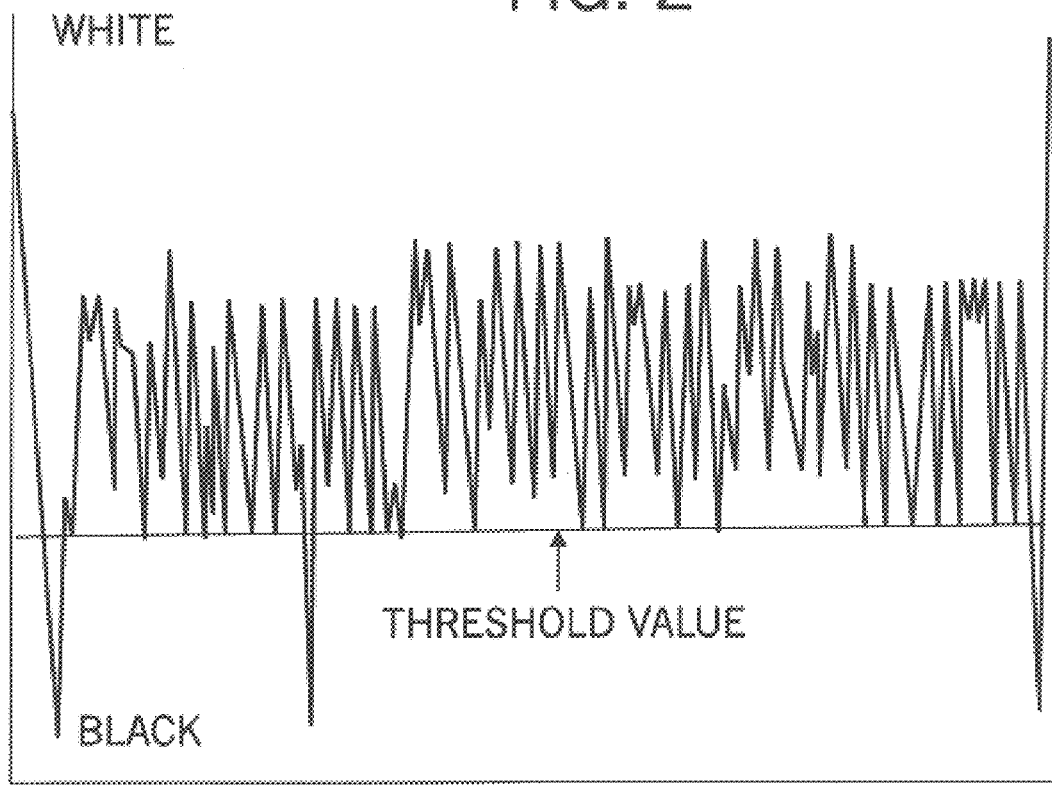

The method in accordance with the invention for determining a threshold value for the maximal (darkest) background grey value, referred to below as threshold value, in a grey value image for a subsequent background cleaning of the image will be described below using the example of a Eurocheque as shown in FIG. 1.

Figure 3:
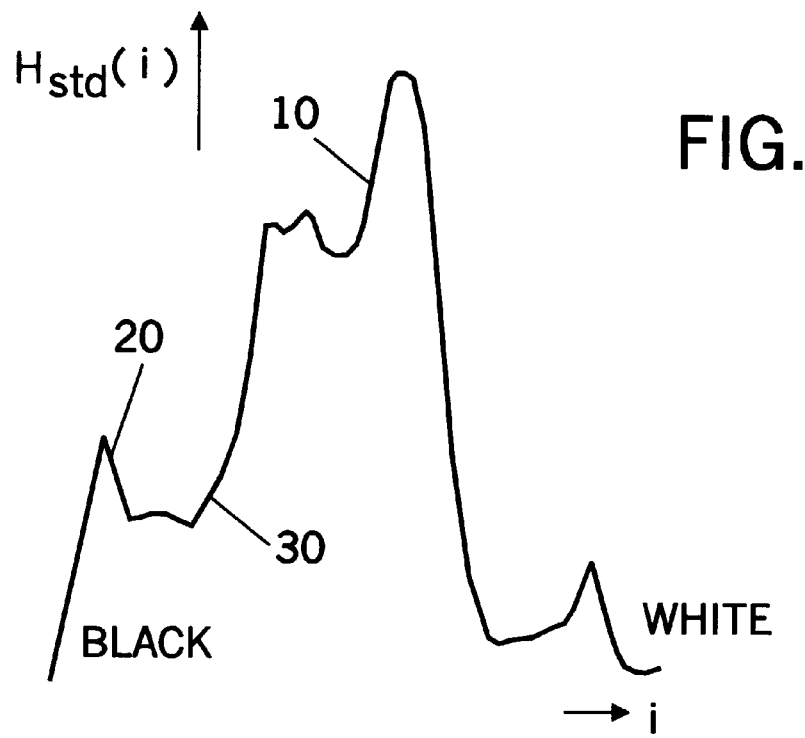

FIG. 3 shows the standard histogram $H_{std}(i)$ of the frequency distribution of the grey value of the image shown in FIG. 1 of the currency and amount fields of a Eurocheque. The frequencies $H_{std}(i)$ shown on the ordinate are the number of image points measured with a grey value of i, where the grey values i are shown on the abscissa and extend from "black" with a grey value i=0 to "white" with the maximal grey value imax.

Region 10 in FIG. 3 essentially contains the background sample information, while the peak 20 is largely produced by the field margins in FIG. 1. The region 30 between the region 10 and the peak 20 contains the written information of the foreground entries. However, where this information is precisely localised, it cannot be determined from this standard histogram $H_{std}(i)$. Also the individual regions overlap so that it is not possible here to separate the information.

As already outlined above in printed documents such as Eurocheques, the background will not fall below a particular grey value—a threshold value—because of the printing technique used in manufacture, in which the color saturation (i.e. the shade of colour) can, in general, be very precisely controlled and also needs to be controlled to ensure legibility. As a consequence of the fact that the grey value of the background does not, in general, fall below the threshold value—and hence is not darker than a particular grey value—the standard histogram should consequently be altered or replaced by another histogram so that it is possible to achieve a separation of the foreground from the background information and the minimal grey value of the background elevated substantially.

In a first step the image document to be processed is divided into separate segments. The segments can have essentially equal areas, but this merely simplifies the subsequent processing of the data and is not essential for the process. In subdividing, care should be taken that the expected threshold value is included at least once in a number of the segments. In addition, there should be "entry free" segments, that is, segments containing only background information and hence lacking foreground information from an entry. With an essentially uniformly structured background pattern, the segment size may advantageously be determined from the sample size of the background by a simple estimation.

If too large a segment size is selected, too little information may be available for the estimation of the threshold value, to be referred to subsequently. This particularly applies in cases where no "entry-free" segments are available because the segment areas are too large. If, however, the segment areas are too small, these may, under certain circumstances, provide too few meaningful data compared with the unsegmented initial image.

Figure 4A:
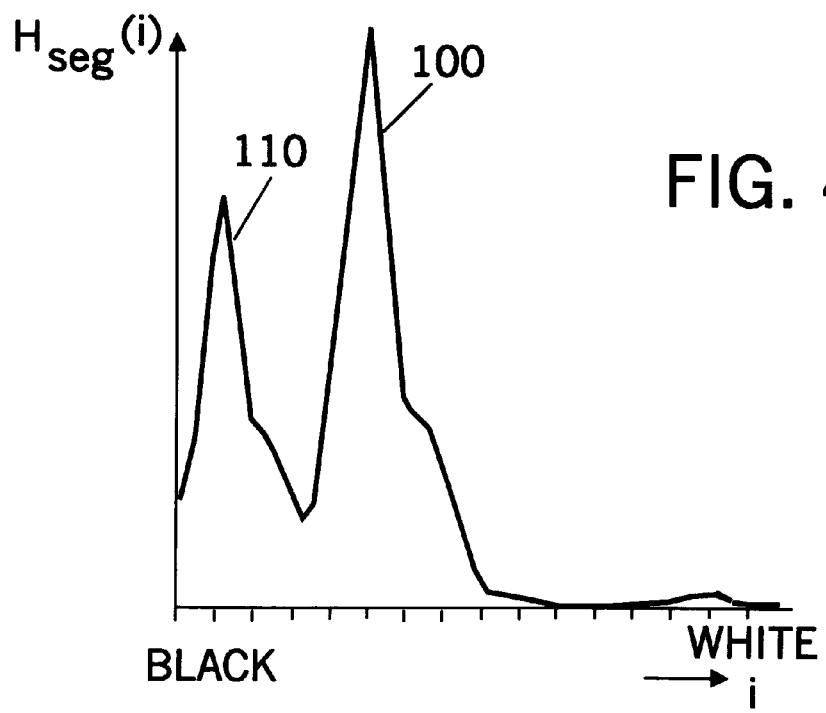

For each segment the darkest grey value (minimum) is determined and entered in a new segment histogram $H_{seg}(i)$, which is also termed a minima histogram. Corresponding to the standard histogram $H_{std}(i)$, the frequencies $H_{seg}(i)$ of the determined segments in the segment histogram with a grey value i are entered on the ordinate for each of the grey values on the abscissa. In a similar way, the grey values i extend from "black" with a grey value i=0 to "white" with a maximal grey value of imax. FIG. 4A shows such a segmented histogram $H_{seg}(i)$ of the frequency distribution of the grey values of the selected segments for the image of the currency and amount field of a Eurocheque shown in FIG. 1. The segment size of a segment selected for this is shown in FIG. 4B with a segment rastering of a part image from FIG. 1. It is to be understood that the segment size shown in FIG. 4B is only an example, but has proved to be advantageous for further processing.

The region (segment) in which the minimal value is determined should be chosen large enough to enable the expected threshold value to be found in it. If the minima appear regularly, as is the case with Eurocheques (FIG. 1), this condition will be met even with very small areas. It was established, however, that even with great variations in the areas of the segments or an overlapping of the segments, the segment histogram $H_{seg}(i)$ scarcely alters. Generally limited pieces of surface, which may also partially overlap, can be used for the segments. As examples of this, mention may be made not only of rectangular regions of different sizes but also linear regions. With half-tone images with only a few grey scales (e.g. 16) or very faded images, the use of a low pass filter is recommended before processing.

The segment histogram $H_{seg}(i)$ obtained (FIG. 4A) and the corresponding standard histogram $H_{std}(i)$ (FIG. 3) are normalized before further processing. Any known normalization process may be used for this purpose. However, both histograms are advantageously normalized over a number of measurement points (image pixels) in a segment. The normalized frequency $H_{norm}(i)$ is then obtained as the product of the sum of all measured values with the grey value i (frequency H(i)) times the number of measurement points per segment:

$H_{norm}(i)$=(measurement points per segment) * H(i)

For the standard histogram $H_{std}(i)$, the number of measurement points (image pixels) in a segment is equal to one, since the standard histogram is unsegmented. In the case of both histograms the sum of all frequencies gives the same value as a result of this normalization. The advantage of this normalization is seen primarily in the fact that in the corresponding processing of the values (the sum of the measurement points per segment is mostly known) in constructing the histogram only multiplication is required and it is no longer necessary to divide. Since the frequencies H(i) and the number of measurement points per segment are in each case integers, the calculations can also be carried out exclusively with integer digits.

Figure 5A:
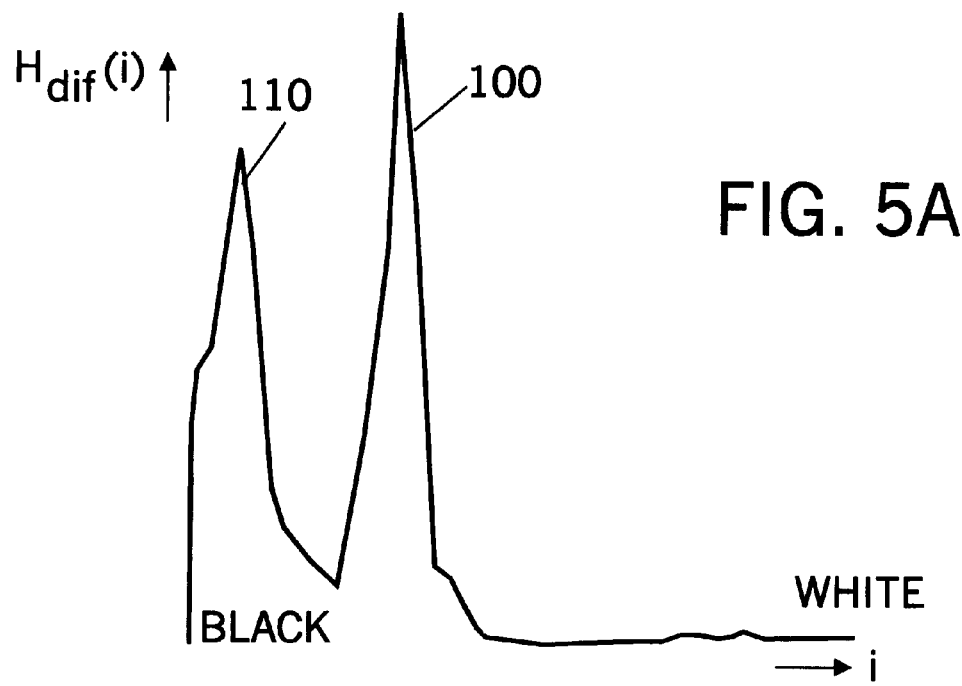

From the normalized segment histograms $H_{seg}(i)$ obtained in accordance with FIG. 4A, the corresponding normalized standard histogram $H_{std}(i)$ (FIG. 3) of the unsegmented image document is subtracted in a subsequent step and entered into a difference histogram $H_{dif}(i)$. FIG. 5A shows such a difference histogram $H_{dif}(i)$, formed from the normalized segment histogram $H_{seg}(i)$ from FIG. 4A and the normalized standard histogram $H_{std}(i)$ from FIG. 3 of the unsegmented image document for the currency and amount field of a Eurocheque from FIG. 1. To simplify the difference histograms, the values which turn out to be negative can, without loss of information, be set equal to zero.

The resultant difference histogram $H_{dif}(i)$, like the segment histogram $H_{seg}(i)$ before it, exhibits a main mode 100—a main maximum—which is close to "white", primarily contains the background information and is consequently named background mode 100. In simple cases, if the entry blackening corresponds to about the maximum blackening, then both the difference histogram $H_{dif}(i)$ and the segment histogram $H_{seg}(i)$ are purely bimodal with only one further main mode 110, which contains the foreground information and consequently is called foreground mode 110.

Figure 5B:
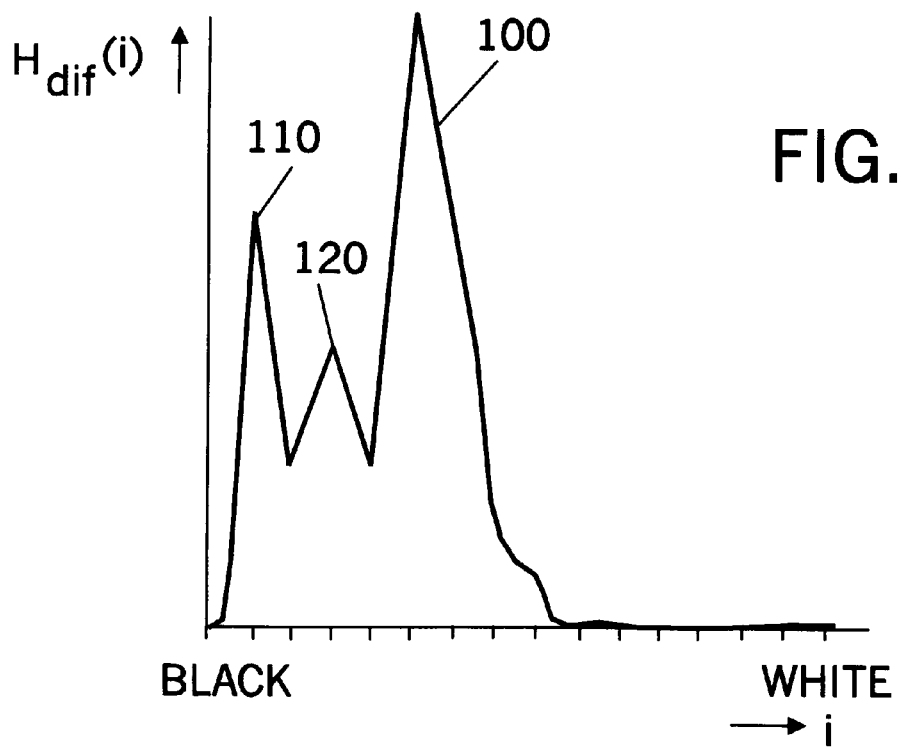

FIG. 5B shows a difference histogram $H_{dif}(i)$, as obtained generally as a multi-modal histogram but with only two main modes from a normalized segment histogram $H_{seg}(i)$ and the associated normalized standard histogram $H_{std}(i)$ of the unsegmented image document. The background mode 100 here contrasts with the several foreground modes 110 and 120, which lie nearer to "black" and contain the foreground information. The foreground modes 110 and 120 are thus split into the main foreground mode 110 with the main maximum and the further foreground mode 120 with one or more subsidiary maxima. These versions made for the difference histogram $H_{dif}(i)$ also apply in an essentially similar manner to the segment histogram $H_{seg}(i)$.

The difference histogram obtained by the above method can now also be processed by methods known from the state of the art, in order to determine the threshold value. A method in accordance with the invention for determining the threshold value is described below. Since the modes concerned are foreground and background modes and the background mode 100, because of the additive superimposition of foreground and background information, has higher grey values, i.e. above a printing technology grey limit, the threshold value can be determined by a suitable limitation of the modes.

FIG. 6 shows the determination of the threshold value $SW_{1N}$ of the background grey value to a first approximation. In a first step in determining the threshold value, starting from the difference histogram $H_{dif}(i)$ produced, the maximal slope occurring on the "dark" flank of the background mode 100 facing towards the "black" side is determined. A threshold value ($SW_{1N}$) of the background grey value is then obtained to a first approximation from the intersection of a straight line with the determined maximum straight line slope on the dark flank, starting from the point of maximum slope $P_{max}$ on the dark flank, with the abscissa.

It should be understood that it is not feasible to determine the threshold value $SW_{1N}$ exclusively from a determination of the maximal slope of the dark flank of the background mode 100. Every linear approximation of a suitable point on at least one of the opposing flanks of the two main modes, because of the separation effected of the foreground and background information, supplies to a first approximation a value of the threshold value which is sufficiently precise, depending upon the application. Which of the points turns out to be suitable for the approximation may, however, vary with the application.

The determination of the threshold value $SW_{1N}$ to a first approximation, as described above, then provides an adequately accurate value for the background threshold value particularly where the areas of the two main modes are of approximately the same size. Referring further to FIG. 5B, however, if the areas of the main modes differ in such a way that the area of the background mode 100 is substantially greater than the area of the foreground modes 110 and 120, then the foreground mode 110 or 120 lying closest to the background mode 100 will be partly superimposed by the background mode 100, so that the threshold value $SW_{1N}$ is too dark, that is, some information may be lost as a result of the threshold value lying too far into the "dark". As limiting value for satisfactorily precise values of the threshold value $SW_{1N}$ the area of the background mode 100 should be somewhat smaller than double the area of the foreground modes 110 and 120.

Figure 7:
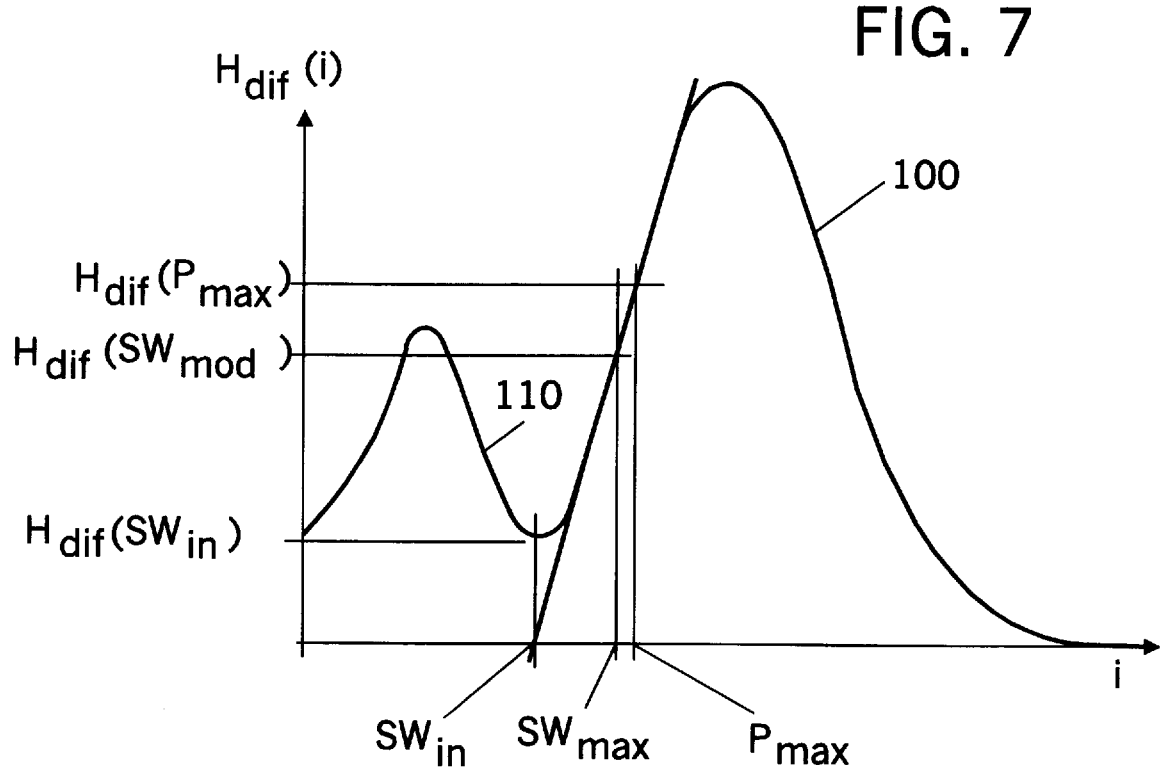

A more precise method for determining the threshold value is shown in FIG. 7. In essence, starting from the threshold value determined to a first approximation in FIG. 6, weighting of the dark flank of the background mode 100 is effected corresponding to the area of the background mode 100 to the whole of the area under the difference histogram $H_{dif}(i)$. The improved threshold value $SW_{mod}$ is calculated in the difference histogram $H_{dif}(i)$ from the difference of the frequencies at the maximum slope $P_{max}$ and the frequencies at the point of the threshold value $SW_{1N}$ to a first approximation, weighted with the area of the background mode 100 to the whole of the area under the difference histogram Hdif(i). The weighting corresponding to the area of the main modes 100 and 110 can also be loaded with a correction factor $\alpha$ and $\beta$, to permit fine tuning. The threshold value $SW_{mod}$ is then calculated in accordance with the following formula:

$$H_{dif}(SW_{mod}) = \frac{H_{dif}(P_{max}) - H_{dif}(SW_{1N})}{\alpha \sum_{i=0}^{SW_{1N}} H_{dif}(i) + \beta \sum_{i=SW_{1N}+1}^{i_{max}} H_{dif}(i)} \sum_{i=SW_{1N}+1}^{i_{max}} H_{dif}(i) + H_{dif}(SW_{1N})$$

From frequency value Hdif($SW_{mod}$) derived from the above equation, the threshold value $SW_{mod}$ is then determined either by reading off or by appropriate interpolation. With a relatively large area for the background mode 100, the threshold value $SW_{mod}$ is displaced in the direction of "white". With a relatively small background mode area no further displacement in the "black" direction will generally be required but may be necessary in certain cases.

The parameters α and β for fine tuning of the weighting will, in the simplest case be selected equal to one. In cases in which fine tuning is required, the values of the parameters α and β can be, e.g. either estimated by working backwards from a comparison of the actual results with the nominal results or determined by a learning process. For such a learning process the following will be required, for example, as input values:

$SW_{1N}$, $P_{max}$, $H_{dif}(P_{max})$, $H_{dif}(SW_{1N})$, $SW_{1N}$ $\Sigma H_{dif}(i)$, i=0

$i_{max}$ $\Sigma H_{dif}(i)$, $i=SW_{1N}+1$ with the starting value:

$H_{dif}(SW_{mod})$

The value of $H_{dif}(SW_{mod})$ determined in this way is then compared with a nominal value $H_{dif}(SW_{nom})$ and from this comparison the parameters α and β determined for fine tuning the weighting. The nominal value $H_{dif}(SW_{nom})$ is preferably produced from an automatic reading procedure, in which the reading error rate is determined for a range of threshold values and a conclusion thus reached on a threshold value with minimal error rate.

The method for determining a threshold value can then be refined further by means of learning, possibly also interactive, from the determined data. Thus, a device for carrying out a method of searching for a threshold value can compare the result, e.g. from writing recognition after background cleaning, with a nominal result, thus allowing the parameters for threshold determination to be optimised by way of a quality statement. In addition to the correction factors α and β which affect the weighting, the point at which the interpolation of the threshold value to the first approximation is carried out can here also serve as a variable. All of this fine tuning can also be effected, with advantage, with a neural network.

It should be understood that the processes represented above for determining a threshold value can also be carried out in a similar way on the "light" (and hence in the direction of "white") flank of the foreground mode 110.

In addition, it is to be understood that all of the above procedures for determining a threshold value can also be carried out with the segment histogram $H_{seg}(i)$. As can be seen from a comparison of FIGS. 4a and 5a, the segment histogram differs in this case only slightly from the difference histogram derived from it. For a range of applications it has been shown, however, that a joint evaluation of segment histogram and difference histogram provides particularly cogent results and thus permits easier evaluation for determining the threshold value. Joint evaluation of segment histogram and difference histogram is to be understood to mean any form of evaluation making use of information from both histograms and deriving further information from them. In the above described example the joint evaluation was achieved by subtracting the histograms. Other joint evaluation procedures would be, for example: weighting of the standard histogram with the segment histogram (e.g. by multiplication or division element by element); a parallel slope evaluation and forming a weighed slope; an evaluation of separation points, i.e. points at which the histogram is zero, in both histograms to improve the case, when a separation between foreground and background occurs; or the like.

With the calculated threshold value, various processes can now be carried out on the image document. Advantageously, background cleaning can be carried out by so-called "thresholding", where all points on the image with a grey value larger than the determined threshold value are set to a grey value of "white". For further digital processing all image points with a grey value less than the threshold value can be set to "black".

In addition, this process also allows reductions of grey values to be carried out, by using the above described methods for determining threshold values for each flank of all (main) modes. The threshold values so determined represent not only a background/foreground threshold value, but also a range of threshold values which enable a differentiation to be made between different objects in the foreground information.

Figure 8:
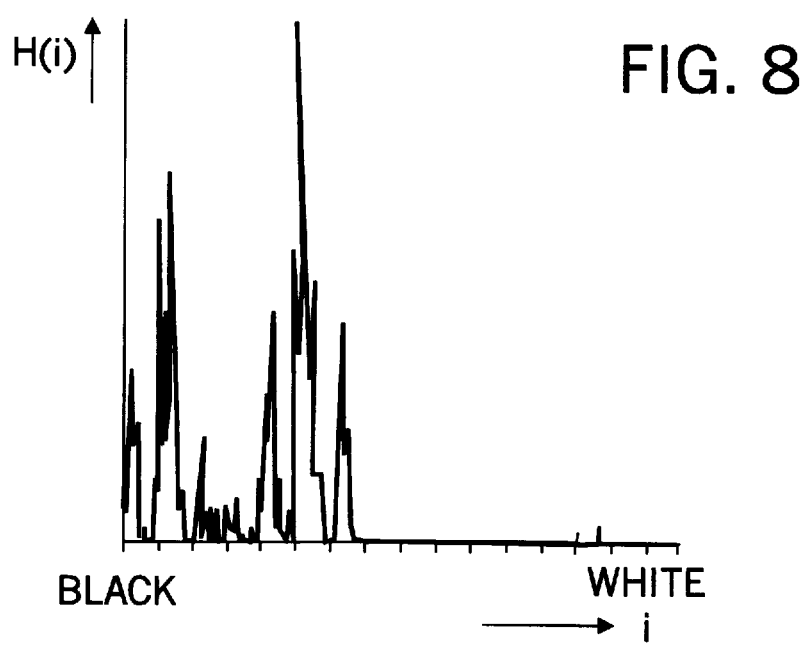

In many applications, because of the limited number of image and measurement points, it is recommended that these be smoothed before the histogram is further processed. FIG. 8 shows an unsmoothed histogram such as is frequently obtained because of the limited image resolution. Any known process may be employed for smoothing. One embodiment of the invention employs a vicinal point smoothing method weighted with a Gaussian function. In this the sum of a number of adjacent points (including the starting point), each weighted with a Gaussian function, is formed and the weight normalized on the sum. In this way it is possible to smooth the histogram overall and eliminate the smaller subsidiary modes. It should be understood here, however, that functions other than Gaussian, such as, for example, a rectangular function or the like, can also be used for weighting.

Overall, exceptional results, which meet the requirements of modern image processing, can be achieved relatively simply and at high speed with the threshold value search method in accordance with the invention.

The present algorithm was checked with a number of scanned Eurocheque images. The electronic images were generated with various scanners (16 and 256 grey scales) and with different resolutions (200–300 dpi). The desired regions were then selected from these images and converted into black and white images using the above method. Regardless of scanner and resolution, the results were satisfactory for subsequent electronic processing (electronic character recognition).

FIGS. 9 and 10 show the results of background cleaning of the image from FIG. 1, produced by known processes, namely FIG. 9 with the "dynamic thresholding with linear averages" and FIG. 10 with the "dynamic thresholding with area averages". In comparison, FIG. 11 shows a result of background cleaning of the image from FIG. 1 with a method in accordance with the invention.

It is clear that in the above described method in accordance with the invention the relevant data can also be processed directly—in the sense of electronic data processing—without the necessity to produce diagrams graphically. The proposed methods are accordingly also suitable for use in an automated computer program.

The process in accordance with the invention is particularly well suited to the conversion of grey regions of images with highly structured backgrounds into black and white images. A complete treatment of a whole document (e.g. a complete Eurocheque) is, however, not always to be recommended, since this will involve a range of different types of background which, for example, are not highly structured. Here a partial processing of the document in regions which have the same type of background is recommended.

Of course, many modifications to the present invention will be apparent to those skilled in the art. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention. Also, it will be understood that some of the features of the present invention may be useful without the corresponding use of other features. Accordingly, the description of the present invention should be considered as merely illustrative of the features and not in limitation thereof.

I claim:

1. Method of separating foreground information from background information on a document where the foreground information is superimposed on the background information, the steps of the method comprising:
    dividing the document into a plurality of segments with a plurality of segments including an expected threshold value and a plurality of segments containing only background information;
    generating from each said segment at least one signal representative of information within said segment;
    determining at least one first frequency distribution of at least one extreme value of the intensity of said signals in a plurality of said segments, where the determined frequency distribution comprises one main mode representative of said background information;
    determining a second frequency distribution of the intensity of signals from a plurality of said segments; and
    jointly evaluating said first frequency distribution and said second frequency distribution to determine said threshold value.

2. Method in accordance with claim 1, wherein the step of jointly evaluating is effected by superimposition, preferably an additive or subtractive superimposition, of said first frequency distribution and said second frequency distribution.

3. Method in accordance with claim 1 further including a step of eliminating small subsidiary nodes by smoothing at least one of said first and/or second frequency distributions and/or the superimposition contained in the step of jointly evaluating.

4. Method in accordance with claim 3, wherein the smoothing step includes summing a number of adjacent points with weighting and normalizing the sum of the weights.

5. Method in accordance with claim 4, wherein the smoothing step uses a function chosen from a Gaussian function and a rectangular function.

6. Method in accordance with claim 1 further including a step of deriving a threshold value of a signal intensity of the background information in the document, either:
    from that flank of a first main background mode which is directed towards foreground information, or
    from that flank of a second main mode which is directed opposite to said background mode.

7. Method in accordance with claim 6, wherein the step of deriving the threshold value exhibits a step of a linear approximation of a slope of a point on at least one of said flanks of said first or second main modes.

8. Method in accordance with claim 7, characterized in that the step of linear approximation is carried out on a point ($P_{max}$) with a maximum flank slope on each of said first and second main modes.

9. Method in accordance with claim 6, wherein the step of deriving the threshold value exhibits a step of weighting the threshold value obtained by linear approximation with that from areas enclosed by said two main modes.

10. Method in accordance with claim 6, further including a step of applying said threshold value for cleaning up background information in the document.

11. Method in accordance with claim 10, characterized in that said information within said document is divided up into information with signal intensities above and below said threshold value.

12. Method in accordance with claim 11 further including a step of eliminating that region of the information which contains said background information.

13. Method in accordance with claim 12, characterized in that, in a black and white conversion of electronic grey scale images, all information with a grey value lighter than a grey value corresponding to the threshold value is set to a grey value of 'white'.

14. Method in accordance with claim 13, wherein all remaining information with a grey value darker than the grey value corresponding to the threshold value is set to a grey value of "black".

15. The method of claim 1 wherein said document comprises a highly structured background, and further comprises the step of reducing said background.

16. A program storage device readable by a machine, tangibly embodying a program of instructions executable by a machine to perform method steps for separating foreground information from background information on a document where the foreground information is superimposed on the background information, said method steps comprising:
    dividing the document into a plurality of segments with a plurality of segments including an expected threshold value and a plurality of segments containing only background information;
    generating from each said segment at least one signal representative of information within said segment;
    determining at least one first frequency distribution of at least one extreme value of the intensity of said signals in a plurality of said segments, where the determined frequency distribution comprises one main mode representative of said background information;
    determining a second frequency distribution of the intensity of signals from a plurality of said segments; and
    jointly evaluating said first frequency distribution and said second frequency distribution to determine said threshold value.

17. An article of manufacture comprising:
    a computer useable medium having computer readable program code means embodied therein for separating foreground information from background information on a document where the foreground information is superimposed on the background information, the computer readable program means in said article of manufacture comprising:

computer readable program code means for causing a computer to effect dividing the document into a plurality of segments with a plurality of segments including an expected threshold value and a plurality of segments containing only background information;

computer readable program code means for causing a computer to effect generating from each said segment at least one signal representative of information within said segment;

computer readable program code means for causing a computer to effect determining at least one first frequency distribution of at least one extreme value of the intensity of said signals in a plurality of said segments, where the determined frequency distribution comprises one main mode representative of said background information;

computer readable program code means for causing a computer to effect determining a second frequency distribution of the intensity of signals from a plurality of said segments; and computer readable program code means for causing a computer to effect jointly evaluating said first frequency distribution and said second frequency distribution to determine said threshold value.

* * * * *